United States Patent [19]
Diccianni

[11] 3,729,905
[45] May 1, 1973

[54] FILTERING DEVICE

[75] Inventor: Anthony M. Diccianni, Norristown, Pa.

[73] Assignee: Laminar Flow, Inc., Canshohacken, Pa.

[22] Filed: Aug. 20, 1970

[21] Appl. No.: 65,559

[52] U.S. Cl. .................... 55/490, 55/473, 55/481, 55/DIG. 29, 98/115 LH
[51] Int. Cl. ................................................ B01d 25/22
[58] Field of Search .................... 55/DIG. 29, 473, 55/478, 481, 490, 493; 98/115 LH

[56] References Cited

UNITED STATES PATENTS

| 3,434,269 | 3/1969 | Hyatt | 55/500 |
|---|---|---|---|
| 3,360,910 | 1/1968 | Soltis | 55/509 |
| 3,383,841 | 5/1968 | Olson et al. | 55/481 |
| 3,470,679 | 10/1969 | Ramsey | 55/473 |
| 3,423,908 | 1/1969 | Hart | 55/481 |
| 3,426,512 | 2/1969 | Nesher | 98/115 H |

FOREIGN PATENTS OR APPLICATIONS

| 655,121 | 12/1928 | France | 55/493 |
|---|---|---|---|
| 1,324,386 | 3/1963 | France | 55/503 |

Primary Examiner—Bernard Nozick
Attorney—Seidel, Gonda & Goldhammer

[57] ABSTRACT

An air filtering device with its filter in a housing. The filter is restrained in the housing by the cooperation of opposed cylindrical members that bear against wedge-like surfaces so that the filter is urged against a support inside the housing.

6 Claims, 3 Drawing Figures

INVENTOR
ANTHONY M. DICCIANNI
BY
Seidel, Gonda, i Goldhammer
ATTORNEYS

INVENTOR
ANTHONY M. DICCIANNI

BY
Seidel, Gonda & Goldhammer
ATTORNEYS

FILTERING DEVICE

This invention relates to air filtering systems and more particularly to a mechanism for restraining a filter against a support.

Filtering units are used in many commercial and domestic situations wherein an environment free from pollen, dust particles and other solids carried in the air is desired.

These filtering units are generally relatively large structures having a blower connected to a plurality of axially aligned plenum chambers which are generally disposed adjacent a filter housing so that air driven therethrough is cleansed by the filter.

A substantial reduction in the cost of maintaining these filtering devices could be achieved by providing a relatively simple mechanical locking device for restraining the filters in position in the filter housings so that they could be quickly and easily removed for replacement.

Accordingly, it is an object of this invention to provide a novel and unobvious means for restraining a filter in a filter housing.

It is a further object of this invention to provide a filter restraining means which substantially simplifies the removal and installation of filters in a filter housing.

Generally, the invention relates to a restraining means for an air filter of the type that has a rigid perimeter. The restraining means includes a support upon which the filter rests and a plurality of oppositely directed camming surfaces are disposed in facing relation to the filter support. Means are provided for bearing against the oppositely directed surfaces and the filter perimeter so that the filter is restrained against movement away from the filter support.

Other objects and advantages of the subject invention will be apparent from the detailed description of a presently preferred form of the invention which follows wherein.

Figure 1:
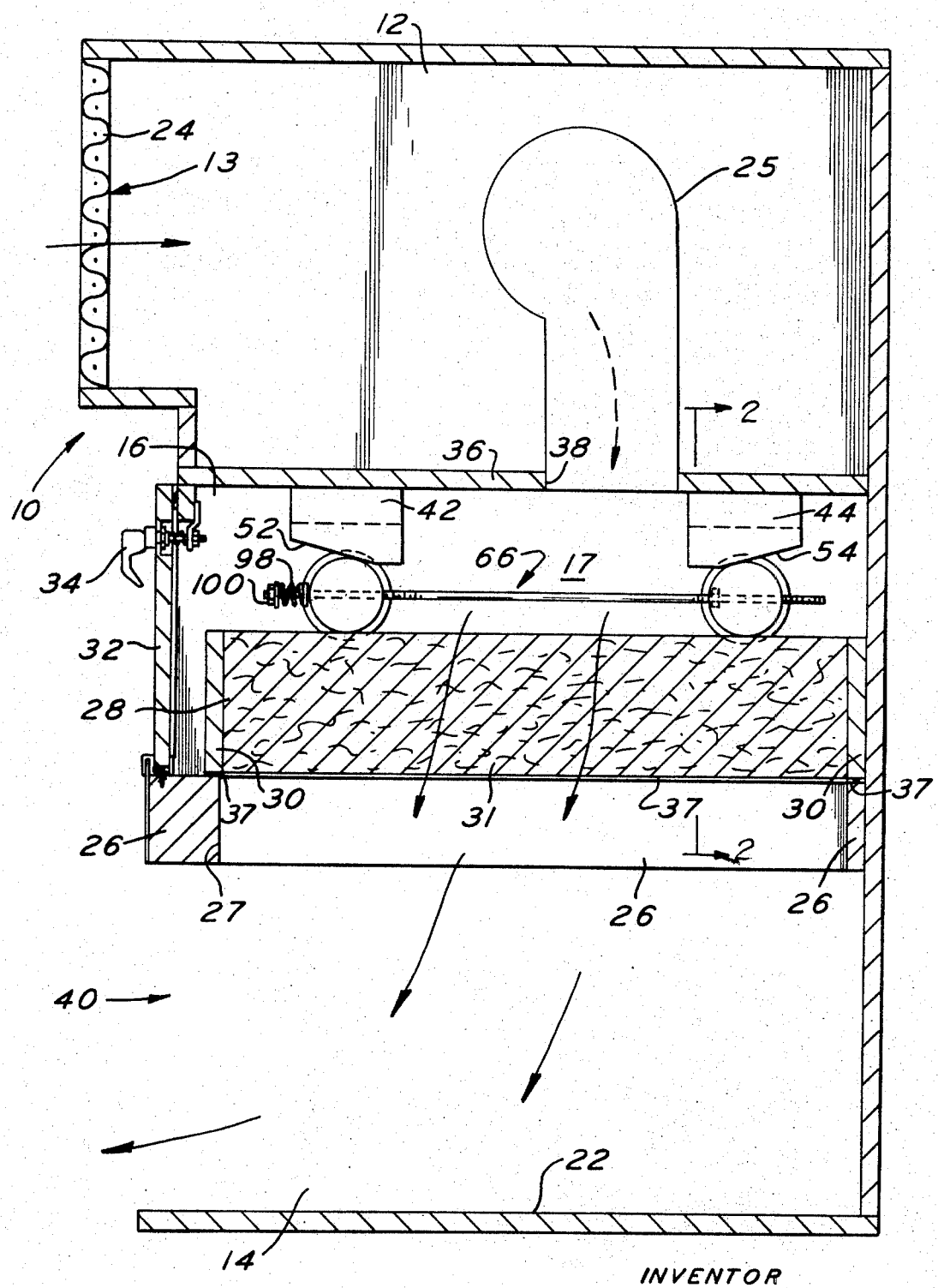
FIG. 1 is side section view of a presently preferred form of the invention.

Referring now to the drawings for a description of a presently preferred form of the invention, an assembly 10 showing the filter restraining means is illustrated in FIG. 1. The assembly comprises an upper inlet negative pressure plenum chamber 12, a lower work area 14 and a filter housing 16 disposed therebetween. Within the filter housing 16 there is a positive pressure plenum 17. The plenum chambers 12 and 17 define a closed circuit for an air current as will be more completely described herein.

Figure 2:
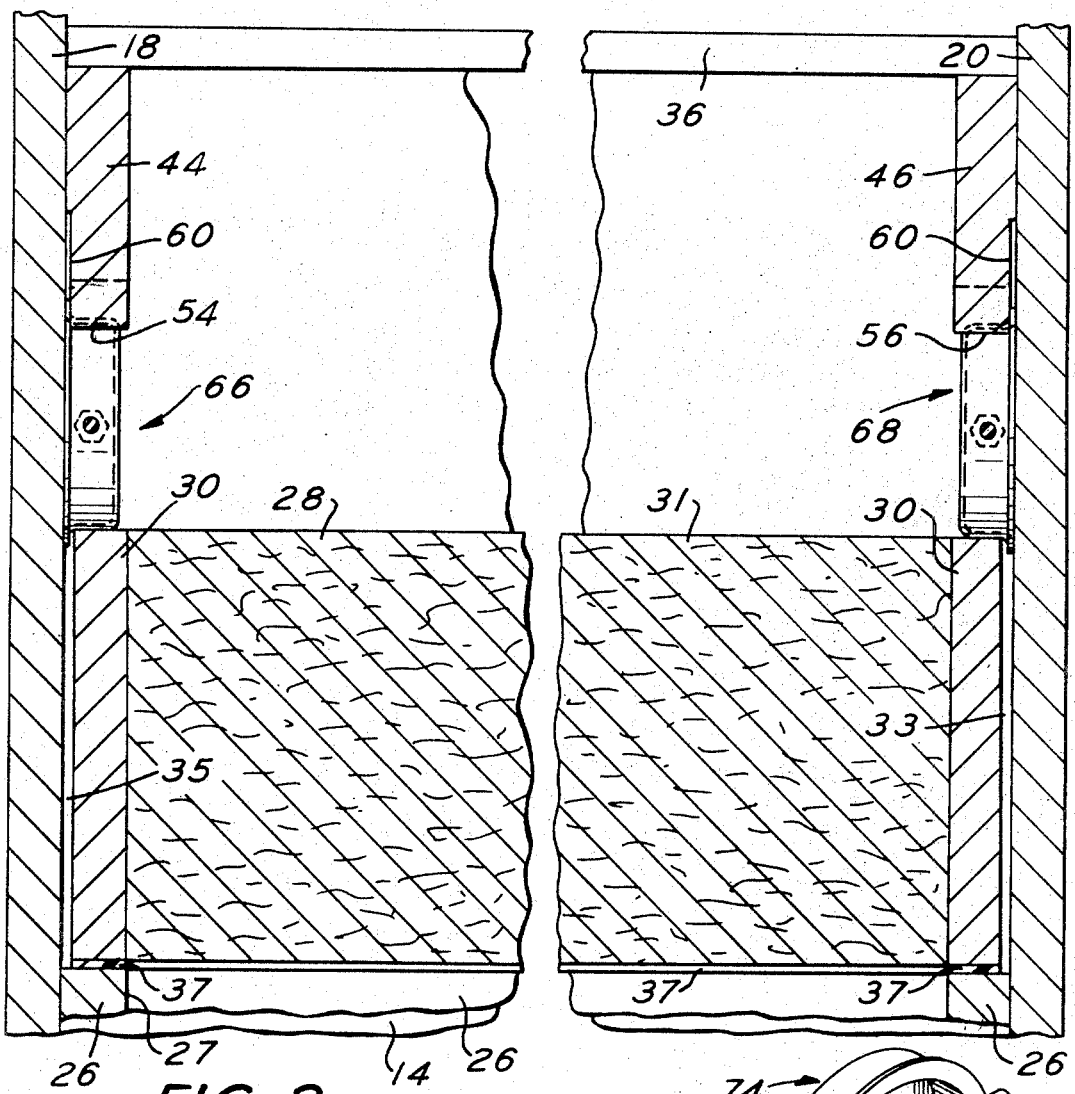
FIG. 2 is a sectional view taken along line 2—2 of FIG. 1.

As best seen in FIG. 2, the assembly 10 comprises two side walls 18 and 20 and front and rear walls.

The upper chamber 12 includes an inlet 13 which is covered by a suitable prefilter 24 to prevent the entry of large particulate matter into the assembly.

A filter support 26 is provided at the juncture of the lower pressure plenum chamber 17 and the work area 14. The filter support is comprised of a plurality of elongated elements supported by the side walls and front and rear walls of the assembly so that a perimeter with a centrally positioned opening 27 is provided. A filter 28 having a perimeter defined by a rigid frame 30 and a center 31 of filter material is supported by filter support 26 so that the filter material overlies centrally positioned opening 27. The outer dimensions of the frame 30 are such that when it is positioned in the filter housing it is spaced from the side walls 18 and 20 to define gaps 33 and 35.

The rigid frame 30 may be provided with a gasket 37 made from a suitable elastomeric material such as neoprene. The gasket 37 and filter support 26 cooperate to create an airtight seal so that all of the air in the positive pressure plenum chamber 17 flows through the filter 28 rather than around it.

Access to the filter housing is by a suitable door 32. The door is held in its closed position by a handle 34.

Upper wall 36 of the upper chamber 12 is provided with an opening 38 which defines an inlet to the plenum chamber 17. The purified air is delivered to the work surface 22. A centrifugal blower 25 is provided to force the air through the filter 28 and into the work area 14. Air in the work area 14 is delivered to an outlet 40 through which purified air may egress.

As best seen in FIGS. 1 and 2, the side walls 18 and 20 each support a set of two wedge-like blocks on opposite sides of the filter housing. Two of such wedge-like blocks 42 and 44 are supported by side walls 18 as illustrated in FIG. 1. One of the wedge-like blocks 46 defining the set supported by side wall 20 can be seen in FIG. 2. Each of the wedge-like blocks in each set comprise inclined surfaces 52, 54 and 56 which are downwardly facing and inwardly directed to provide a camming and locking effect as will be more completely explained herein.

It should be noted that each of the wedge-like blocks has a notch 60 which is formed by having a portion of its outer surface cut away. Thus, when the blocks are installed on the side walls, recesses intermediate their lower portions and side walls 18 and 20 are formed.

Suitable restraining means 66 and 68 cooperate with the aforementioned sets of wedge-like blocks and the rigid frame 30 to resiliently hold the frame in close contact with filter support 26.

Figure 3:
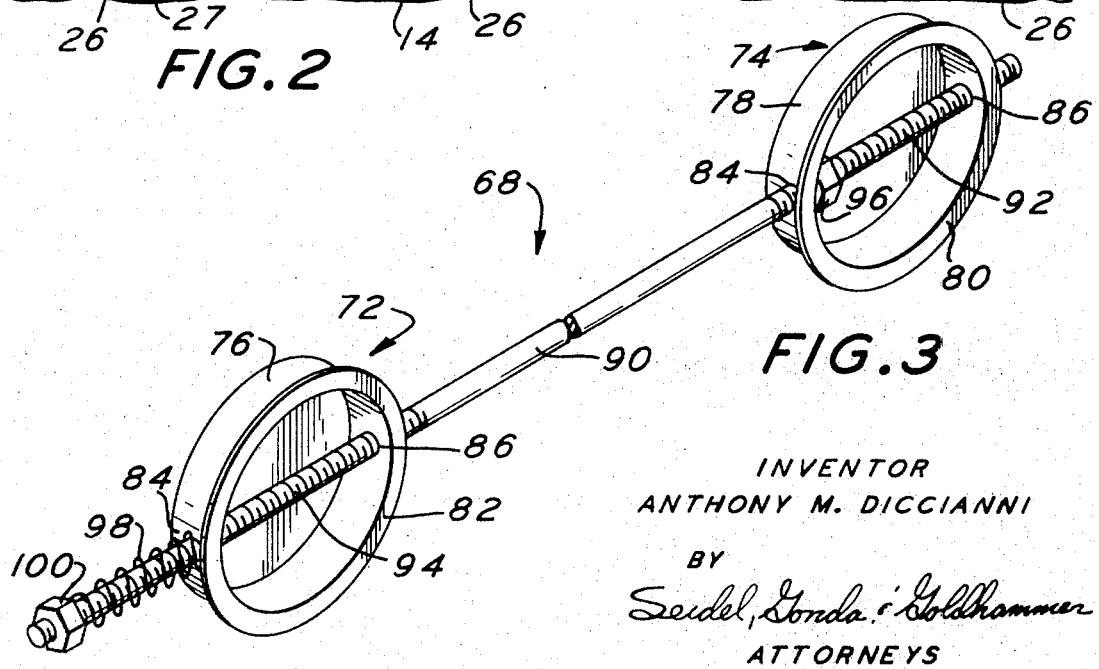
FIG. 3 is a perspective view of a portion of the restraining means.

One of the restraining means 68 is illustrated in FIG. 3. It comprises two caps 72 and 74. Each of the caps comprises a relatively short cylindrical body 76 and 78 having a radially outwardly directed flange 80 and 82. Additionally, each of the cylindrical bodies is provided with two diametrically opposed openings 84 and 86. An elongated shaft, threaded at each end, is slidably received in each of the diametrically opposed openings in each of the cylindrical bodies to couple the caps 72 and 74 to each other.

Cap 74 is constrained against sliding movement on threaded end 92 of elongated shaft 90 by a suitable nut 96. As is apparent, by adjusting nut 96, cap 74 can be adjusted along shaft 90 to a convenient position. At the opposite end of shaft 90 cap 72 is slipped over threaded end 94. A suitable helical compression spring 98 is slipped over the exposed portion of end 94 and is held in position by a suitable nut 100. As is apparent, as nut 100 is tightened cap 72 will be driven along the threaded shaft toward cap 74. This arrangement is successfully utilized in resiliently and positively holding the filter 28 in close intimate contact with the filter support 26.

As illustrated in FIGS. 1 and 2 a restraining means of the type shown in FIG. 3 is provided for each side of the filter housing so that one is adjacent wall 18 and the other is adjacent wall 20. As shown in FIG. 2, the aforementioned flanges 80 and 82 are received in the recesses formed between the wedge-like blocks and the side walls and gaps 33 and 35 so that the restraining means are held against frame 30.

By referring to FIG. 1 it is apparent that as nut 100 on each shaft 90 is tightened, spring 98 tends to exert an axial force along the shaft. This tends to cause caps 72 and 74 to move toward each other. By virtue of the downwardly and inwardly directed sloping surfaces on each of the sets of wedge-like blocks, the two caps on each side are driven toward each other, driving the filter and its frame downwardly toward support 26. The springs tend to act as a safety device in order to permit the caps or the frame supporting filter from being crushed and also provide constant tension.

Installation of a filter with the above described restraining device is relatively simple in that handle 34 is rotated, and filter housing access door 32 is removed. Each of the nuts 100 on the shafts 90 disposed on opposite sides of the rigid frame 30 are removed and the caps are disengaged from the respective wedge blocks. A second filter can then be placed in position over the filter support 26. The two caps are then installed on each side as illustrated in FIG. 1 and 2 and then the helical springs and nuts are then placed in position and tightened.

While the invention has been described with reference to a particular embodiment thereof it is apparent that many other forms and embodiments will be obvious to those skilled in the art in view of the foregoing disclosure. Accordingly, the scope of the invention should not be limited by the foregoing disclosure but only by the scope of the claims appended hereto.

I claim:

1. A restraint for a filter of the type having a perimeter of rigid material comprising, a housing defining upper and lower plenum chambers with a filter housing disposed therebetween, said filter housing having means supporting a filter along its perimeter, means supported by said housing defining at least two oppositely inclined camming surfaces disposed in facing relation to said means supporting a filter, restraining means comprising at least two cam members coupled to each other, each of said cam members having a substantially peripheral surface, said peripheral surface on each of said cam members being engaged by one of said camming surfaces and being disposed between said camming surfaces and said means supporting a filter, means for displacing one of said cam members toward the other along their respective camming surfaces to displace them toward said means supporting a filter, and said restraining means includes means for resiliently urging said cam members along said camming surfaces toward said means supporting a filter.

2. A device as defined in claim 1 wherein said means for resiliently urging said cam members along said camming surfaces comprises an elongated member slidably connected to each of said cam members and having spring means in engagement with one of said cam members for urging it toward said other cam member.

3. A device as defined in claim 1 wherein said cam members are cylindrical in shape and are provided with flanges on their peripheral surfaces, is restrained on said means for supporting a filter.

4. A device as defined in claim 1 wherein each of said cam members is provided with openings in their peripheral surfaces, an elongated threaded shaft slidably received through said openings, means for constraining one of said cam members at one end os said shaft, and a spring at the other end of said shaft, said spring urging said other cam member toward said one cam member.

5. A device as defined in claim 1 wherein said filter housing includes opposed side walls, said camming surfaces being supported by said filter housing inwardly of said side walls, and at least two of said oppositely inclined camming surfaces are disposed adjacent each of said side walls.

6. A device as defined in claim 5 wherein each of said cam members has a cylindrical shape with a radially outwardly directed flange thereon, and said flanges are disposed intermediate said camming surfaces and said side walls to constrain the movement of said cam members along the perimeter of a filter.

* * * * *